United States Patent [19]

Betts et al.

[11] Patent Number: 4,462,483

[45] Date of Patent: Jul. 31, 1984

[54] SOLID PROPELLANT SOUND GENERATOR FOR COAGULATION OF AEROSOLS

[75] Inventors: Robert E. Betts, Huntsville; Lawrence B. Thorn, Madison, both of Ala.

[73] Assignee: The United States of America as represented by the Secretary of the Army, Washington, D.C.

[21] Appl. No.: 510,710

[22] Filed: Jul. 5, 1983

[51] Int. Cl.$^3$ .............................. G10K 10/00
[52] U.S. Cl. .................. 181/142; 116/137 R
[58] Field of Search ........... 116/37 R, 137 R, 105, 116/104; 98/1; 181/142

[56] References Cited

U.S. PATENT DOCUMENTS

| | | | |
|---|---|---|---|
| 2,414,495 | 1/1947 | Vang | 98/1 |
| 2,417,480 | 3/1947 | Friedman | 46/179 |
| 3,903,988 | 9/1975 | Hermsen et al. | 116/137 |

OTHER PUBLICATIONS

Aerosol Science, Edited by C. N. Davies, Academic Press 1966, pp. 52–57, Coagulation of Aerosols, Sonic Fields (Acoustic Coagulation).
Sonics; T. F. Huter and R. H. Bolt, Pub. by John Wiley & Son, 1955 pp. 211–219.

*Primary Examiner*—Maynard R. Wilbur
*Assistant Examiner*—M. R. Gordon
*Attorney, Agent, or Firm*—Anthony T. Lane; Robert P. Gibson; Jack W. Voigt

[57] ABSTRACT

A solid propellant gas generator operating with a calibrated tunable resonator produces a strong sonic field capable of affecting particle coagulation in an aerosol. The resonator is calibrated to produce a sonic field at the optimum frequency for a given aerosol and can be changed according to the aerosol involved. The resultant coagulation increases visibility and/or electromagnetic transmissibility within the sonic field. The device can be used to reduce obscuration during battlefield operations.

4 Claims, 2 Drawing Figures

SOLID PROPELLANT SOUND GENERATOR FOR COAGULATION OF AEROSOLS

DEDICATORY CLAUSE

The invention described herein may be manufactured, used, and licensed by or for the Government for governmental purposes without the payment to us of any royalties thereon.

BACKGROUND OF THE INVENTION

A significant problem associated with battlefield operations is obscuration. Smoke and dust are generated by the movement of men and equipment and use of weapons. Countermeasures such as "smoke screens" add to the problem. Aside from visual obscuration, many new weapon systems rely on the electromagnetic characteristics of the battlefield. Lasers are used to designate targets. Infrared sources and seekers are also used. Particles suspended in the air in aerosols degrade both visual and electromagnetic capbilities. In most all instances natural dispersion by wind and gravitational precipitation is relied upon for removal. These conditions are not subject to control. Methods for reducing battlefield obscuration have long been sought.

It is known that with smoke, fog and other aerosols, sound energy causes the particles to coagulate. This acoustic coagulation phenomenon requires very strong sonic fields corresponding to the 150 dB range and of sufficient duration to accomplish the coagulation. Solid propellant rockets are known to develop sound in the 150 dB range. Using rocket motor technology, a sound generator can be constructed wherein a minimum smoke solid propellant gas generator works in conjunction with a tunable resonant cavity to produce a sonic field of appropriate power and duration to affect sonic coagulation. The solid propellant sound generator can be used to enhance the visual and electromagnetic characteristics of a given area.

SUMMARY OF THE INVENTION

A solid propellant sound generator for coagulation of aerosols wherein a gas is generated by a burning solid propellant. The gas passes into a resonator calibrated to vibrate the gas at an optimum frequency for producing acoustic coagulation within a given aerosol. This coagulation will increase gravitational precipitation and decrease particle density. This action will tend to increase visibility and electromagnetic transmissibility in the sonic field.

DESCRIPTION OF THE PREFERRED EMBODIMENT

Figure 1:
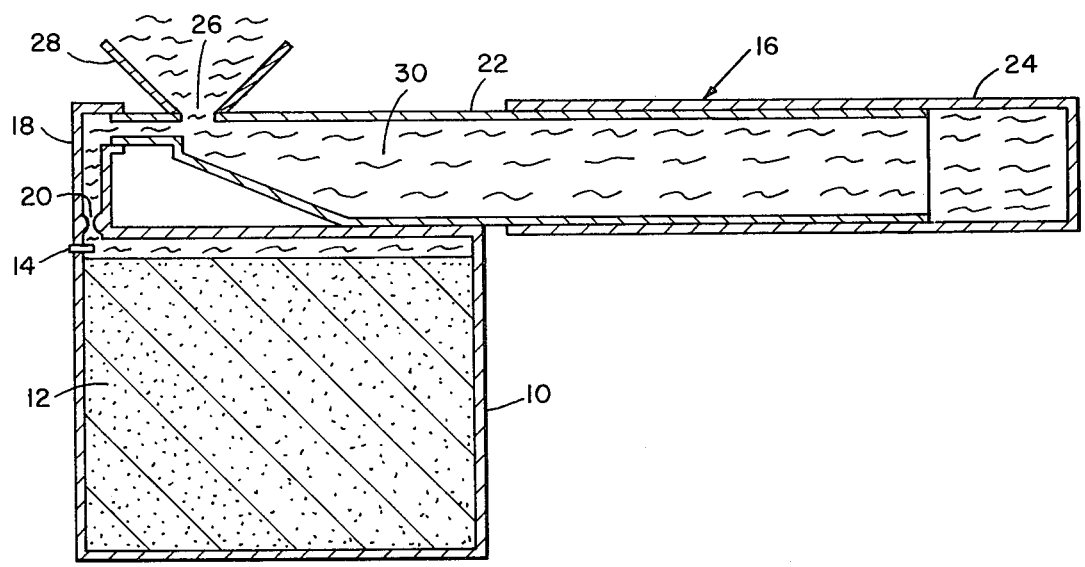
FIG. 1 is a cross-sectional view of the sound generator.

A solid propellant sound generator for coagulating aerosols, as shown in FIG. 1, is comprised of housing 10 containing solid propellant 12. Igniter 14 is mounted in housing 10 so as to initiate burning of the solid propellant when the igniter is fired. Housing 10 is connected to tunable resonator 16 by gas exit conduit 18. Nozzle 20, positioned in gas exit conduit 18, is adapted for converting a fluid at a given pressure into one having a given velocity. Resonator 16 is comprised of resonator housing 22 which is rigidly attached to the gas exit conduit and housing 10, and resonator housing 24 which is moveably connected to resonator housing 22. The internal volume of the resonator is changed by moving resonator housing 24. The resonator has a gas exit port 26 located in resonating cavity housing 22. Horn reflector 28 is connected to resonator housing 22 at the gas exit port to amplify the sound generated.

Figure 2:
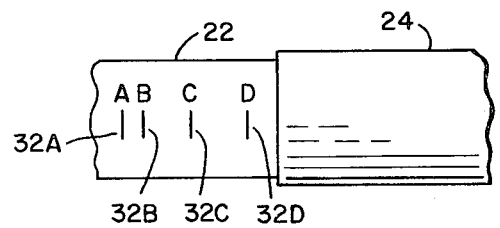
FIG. 2 is a pictorial view of calibration settings on the resonator.

The volume of the resonating cavity determines the frequency of the sound generated. The resonator is calibrated to produce frequencies associated with maximum coagulation effect in various aerosol environments. The calibration of the cavity is accomplished by moving resonator housing 24 to various positions marked on resonator housing 22. Each mark, 32A–32D, is associated with a cavity volume and resultant frequency designed to produce maximum coagulation within a specific aerosol. FIG. 2 illustrates resonator housing 22.

In operation the resonator is set for the desired frequency depending on the type of aerosol environment involved. This is accomplished by positioning resonating cavity housing 24 at the appropriate mark on cavity housing 22. The solid propellant is ignited and burns in a predetermined manner. The gas 30 escapes through nozzle 20 into resonator 16 and out exit port 26. The resonator causes a gas to vibrate and produce a sound at the resonant frequency of the cavity. The sound is amplified by horn reflector 28 producing a sonic field of adequate frequency, power and duration to produce particle coagulation within the aerosol.

We claim:

1. A solid propellant sound generator for coagulating aerosols comprising:
   (a) a housing containing a solid propellant charge;
   (b) means for igniting said solid propellant charge thereby producing a gas;
   (c) a gas conduit connected to said housing adapted for receiving said gas;
   (d) a nozzle rigidly fixed within said gas conduit adapted for converting said gas at a given pressure into one with a given velocity;
   (e) a resonator connected to said gas conduit adapted to accept said gas and cause said gas to vibrate at said resonator's resonate frequency;
   (f) gas exit means adapted to allow said vibrating gas to exit said resonator;
   (g) calibration means for changing said resonant frequency whereby said vibrating gas produces a sound causing maximum coagulation within various identified aerosol environment, said calibration means being comprised of a first resonator housing connected to said gas conduit and a second resonator housing connected to said first resonator housing and adapted to move relative to said first resonator housing, said first resonator housing having calibration marks identifying the position of said second resonator housing for optimum coagulation in an identified aerosol; and,
   (h) amplifing means connected to said gas exit means for amplifing and directing said sound.

2. A solid propellant sound generator for coagulating aerosols as in claim 1 wherein said calibration means is comprised of a first resonator housing connected to said gas conduit and a second resonator housing connected to said first resonator housing and adapted to move relative to said first resonator housing thereby changing the internal volume of said resonator, said first resonator housing having calibration marks identifying the position of said second resonator housing for optimum coagulation in an identified aerosol.

3. A solid propellant sound generator for coagulating aerosols as in claim 1 wherein said resonator includes an orifice therein defining said gas exit means.

4. A solid propellant sound generator for coagulating aerosols as in claim 1 wherein said amplification means is a horn reflector.

* * * * *